Figure 1:
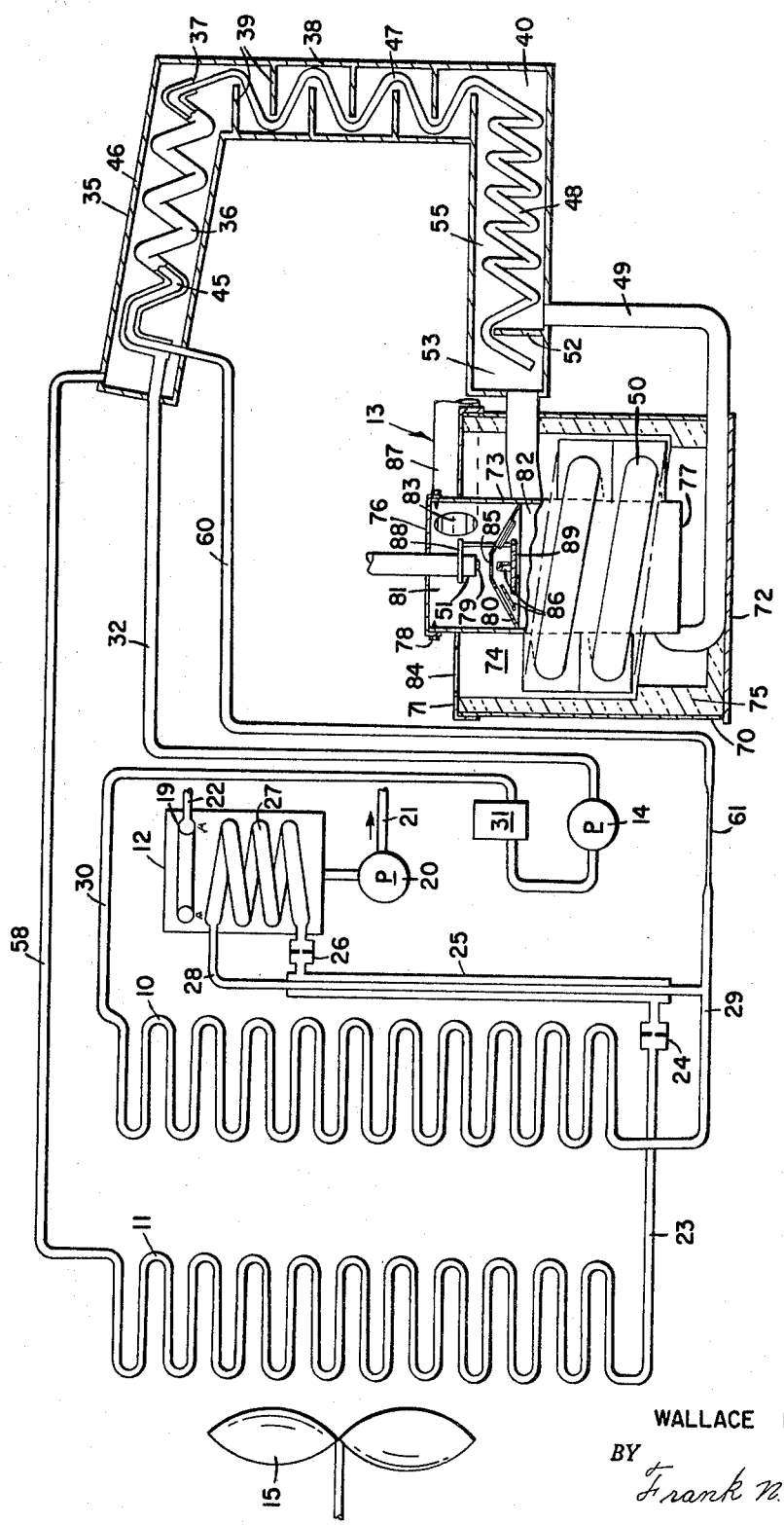

Oct. 18, 1966  W. E. SONNTAG, JR  3,279,213
GENERATOR CONSTRUCTION FOR ABSORPTION REFRIGERATION MACHINES
Filed April 26, 1965  2 Sheets-Sheet 1

INVENTOR.
WALLACE E. SONNTAG, JR.
BY
Frank N. Decker Jr.
ATTORNEY.

Oct. 18, 1966  W. E. SONNTAG, JR  3,279,213
GENERATOR CONSTRUCTION FOR ABSORPTION REFRIGERATION MACHINES
Filed April 26, 1965  2 Sheets-Sheet 2

INVENTOR.
WALLACE E. SONNTAG, JR.
BY
Frank N. Decker Jr.
ATTORNEY.

United States Patent Office 3,279,213
Patented Oct. 18, 1966

3,279,213
GENERATOR CONSTRUCTION FOR ABSORPTION REFRIGERATION MACHINES
Wallace E. Sonntag, Jr., Fayetteville, N.Y., assignor to Carrier Corporation, Syracuse, N.Y., a corporation of Delaware
Filed Apr. 26, 1965, Ser. No. 450,648
10 Claims. (Cl. 62—497)

This invention relates to absorption refrigeration, and more particularly to apparatus which is adapted to be employed as a generator of an absorption refrigeration system.

In absorption refrigeration systems, it is usual practice to employ a generator for heating weak absorbent solution to concentrate the solution and form vapor therefrom. In absorption refrigeration systems of relatively small capacity, such as those designed for household use or for small commercial installations, it is important that the generator be relatively compact and inexpensive to manufacture in order that the machine may be commercially acceptable. It is also desirable that the generator function satisfactorily over a wide range of variations in gas and air input and it is necessary that the generator produce highly efficient burning so that the carbon monoxide output is minimized at all conditions of operation thereof. In addition, it is desirable that the parts of the generator be easily accessible for servicing. It is likewise desirable to provide a construction wherein the danger of explosion is minimized in order that the unit be safe for use in or about a residence or other building.

With the above features in mind, it is a principal object of this invention to provide an improved heating apparatus of the type which may be employed as a generator in an absorption refrigeration system.

In accordance with the illustrated preferred embodiment of this invention, there is provided a generator for an absorption refrigeration system having a closed exterior cylindrical shell and an interior shell disposed in space relation with the walls and bottom of the exterior shell. The interior cylindrical shell has a hollow interior region which is divided by a baffle into an upper air chamber and a lower combustion chamber. A heat exchange coil is disposed within the annular space between the interior and exterior shells and is connected to pass absorbent solution from the absorber of the absorption refrigeration system through the interior of the heat exchange coil. The baffle is provided with a centrally aligned aperture for discharging gas from a suitable gas nozzle into the combustion chamber. The baffle is preferably of a conical shape and a splash plate is provided in the apex of the cone in the combustion chamber to direct the gas toward the inner wall thereof. The baffle is provided with a plurality of radially extending louvers through which air is admitted from the air chamber into the combustion chamber. The louvers are angularly disposed so as to impart a rotational motion to the air about the axis of the combustion chamber in order to mix the gas with the air and to provide efficient combustion.

The generator is disposed within a housing which contains the evaporator and condenser as well as other components of the absorption refrigeration system. The housing has an air inlet for passing ambient air over the condenser and evaporator of the system. The housing is also provided with an air outlet and a fan for discharging air from the interior of the housing. The fan gives rise to a small pressure drop between the exterior and interior of the housing when the fan is in operation.

The air chamber of the generator is connected by an air passage directly to the exterior of the housing. A flue gas discharge opening is provided for discharging flue gas from the annular space between the exterior and interior shells into the interior of the housing containing the absorption refrigeration system. It will be seen that air is drawn through the generator into the combustion chamber by the difference in air pressure existing between the interior of the housing and the exterior thereof. The discharged flue gas is exhausted from the interior of the housing by the fan along with the air passing over the condenser and evaporator.

Figure 2:
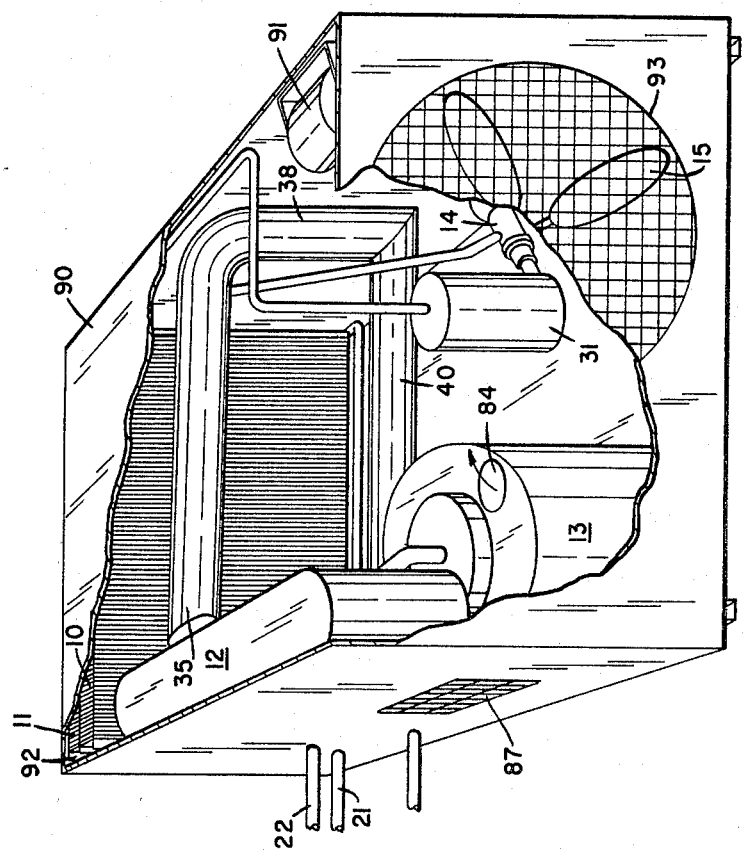

The above and other objects of this invention will become more apparent by reference to the following specification and attached drawings wherein:

FIGURE 1 is a schematic diagram, partly in cross section, illustrating an absorption refrigeration system having a generator made in accordance with this invention; and FIGURE 2 is a perspective view partially broken away of an absorption refrigeration machine of the type schematically illustrated in the preceding figure.

Referring particularly to the drawings, there is shown an absorption refrigeration system having an absorber 10, a condenser 11, an evaporator 12, and a generator 13 connected to provide refrigeration. A pump 14 is employed to circulate weak absorbent solution from absorber 10 to generator 13. As used herein, the term "weak absorbent solution" refers to a solution which is weak in absorbing power, and the term "strong absorbent solution" refers to a solution which is strong in absorbing power. A suitable absorbent solution for use in the system described is water, and a suitable refrigerant is ammonia. For convenience, the absorbent liquid will be referred to as an "absorbent solution," although it will be appreciated that pure water is not technically a solution.

A chilled water pump 20 is provided for forwarding water, or other heat exchange medium chilled in evaporator 12, through chilled water line 21 to a suitable remote location for chilling a refrigeration load. The water is then returned through chilled water line 22 to a spray header 19 from which it is again distributed over the exterior of evaporator coil 27.

Liquid refrigerant is passed from condenser 11 through liquid line 23, refrigerant restriction 24, the exterior passage of liquid suction heat exchanger 25 and second refrigerant restriction 26, to evaporator coil 27 of evaporator 12. Heat from the water to be chilled, passing over the exterior of evaporator coil 27, is given up to the refrigerant which vaporizes in the interior passage of the evaporator coil. The refrigerant vapor passes from coil 27 through vapor line 28, the interior passage of liquid suction heat exchanger 25, to mixing line 29 where it is mixed with strong solution returning to the absorber from the generator.

The mixture of refrigerant vapor and strong solution passes through mixing line 29 into the heat exchange coil which forms absorber 10. Air is passed over the exterior of the absorber coil by fan 15 to cool absorbent solution therein and increase its absorbing power. The absorbent solution is weakened as it absorbs refrigerant vapor during its passage through the absorber. By the time the absorbent solution reaches the discharge end of the absorber coil, the refrigerant vapor is completely absorbed in the absorbent solution and the solution has become weak in absorbing power by the absorption of the vapor.

The weak absorbent solution passes through weak solution line 30 to a purge tank 31 where noncondensible gases are collected and withdrawn from the system. The weak solution is then forwarded by solution pump 14 through weak solution line 32 to combined rectifier and heat exchanger section 35.

Rectifier and heat exchanger section 35 comprises an outer shell 46 forming a vapor passage. Shell 46 contains an inner heat exchanger coil 45 and a concentric outer heat exchange coil 36, as shown in the drawing. Preferably outer heat exchange coil 36 is spirally disposed along the inner wall of shell 46 and it may be provided with suitable fins for enhancing heat transfer.

Coils 36 and 45 form a solution heat exchanger between the entire quantity of relatively hot strong solution passing from the generator to the absorber and the entire quantity of relatively cool weak solution passing from the absorber to the generator. The amount of heat transfer surface provided between the strong and weak solution is designed so that the weak solution is brought to just about its boiling point so that vapor is not formed in the solution heat exchanger.

The weak solution from line 32 passes through coil 36 in the annular space between inner heat exchange coil 45 and outer heat exchange coil 36 where the weak solution is heated to substantially its boiling point by heat exchange with strong solution. After passing through coil 36, the heated weak solution is discharged from opening 37 onto one of a plurality of baffles or plates 39 in analyzer column 38.

Analyzer 38 comprises a tubular member having a plurality of plates 39 which provide surfaces for contact of vapor with the reflux and the solution which wets the surfaces of the plates. The weak solution passes successively over the plurality of plates and is discharged from the bottom of the analyzer into a generator reservoir 40.

Generator reservoir 40 provides solution storage for part load operation conditions and allows for solution and refrigerant charging tolerance, and compensates for manufacturing variations in machine volume.

Weak solution from generator reservoir 40 passes through line 49 into generator coil 50. The solution in coil 50 is heated by suitable means such as gas burner 51 causing the solution to boil thereby forming vapor. The vapor and hot solution is discharged from coil 50 into separation chamber 53, formed by a baffle or weir 52, where the vapor separates from the remaining strong solution. Preferably, some of the solution normally spills over the top of baffle 52 and is recirculated through line 49 to generator coil 50. It will be understood that the solution in separation chamber 53 has been concentrated by vaporizing refrigerant therefrom in generator 13.

Vapor formed in generator 13 passes concurrently with strong solution through the vapor passage 55 formed in the upper portion of generator reservoir 40, through analyzer 38, and through the vapor passage formed by shell 46 of rectifier 35 to condenser 11.

The concentrated or strong absorbent solution from separation region 53 is at the relatively high generator pressure and passes through heat exchange coil 48 in generator reservoir 40, heat exchange coil 47 in the analyzer column, and inner heat exchange coil 45 in the rectifier. The strong solution then passes through line 60 and restriction 61 into mixing line 29 and absorber 10 on the relatively low pressure side of the system.

Heat from the strong solution passing through coil 48 boils the weak solution in the generator reservoir to vaporize refrigerant therefrom. The heat exchange which takes place in the generator reservoir results in cooling the strong solution flowing through coil 48 so that it enters the analyzer and rectifier respectively at the best temperature to achieve maximum efficiency with minimum heat transfer surface.

A portion of coil 48 is submerged below the level of weak solution in reservoir 40 and another portion of the coil is disposed in the vapor passage above the weak solution. The boiling of the weak solution causes the portion of coil 48 which is disposed in vapor passage 55 to be wetted with solution. As the strong solution passes through coil 48, it becomes progressively cooler. Vapor formed in the generator and in the reservoir passes through the vapor passage 55 and contacts the exposed wetted portion of coil 48 in reservoir 40, and mass and heat transfer take place with the weak solution boiling in the reservoir. It will be appreciated that ammonia vapor will be boiled from the weak solution in the reservoir and that water vapor will be condensed from the vapor space into the weak solution in proportions resulting in an enrichment of the refrigerant content of the vapor passing through the reservoir. Also, the condensation of water vapor into the weak solution will liberate additional heat which assists in vaporizing the solution.

Similarly, as the vapor passes from the reservoir upwardly through analyzer column 38, a mass and heat transfer takes place between the weak solution passing downwardly over plates 39 in the column and further enriches the refrigerant content of the vapor.

The vapor then passes through rectifier 35 where it is placed in heat exchange relation with the weak solution passing through coil 36. The heat transfer which takes place in the rectifier results in condensing additional water from the vapor which then leaves the rectifier in a highly purified or enriched state.

The purified refrigerant vapor passes from rectifier 35 through line 58 into the coil of condenser 11. Fan 15 passes air over condenser 11 causing the refrigerant vapor to condense. The condensed refrigerant passes through line 23 and restriction 24 into evaporator 12, as previously explained.

As the vapor passes through rectifier 35, the reflux or solution which is condensed flows by gravity to analyzer 38 and passes downwardly through the analyzer column along with weak solution discharged from outlet 37 of coil 36. This rectifier condensate is heated along with weak solution in the analyzer to produce additional vapor by heat exchange with strong solution passing through coil 47.

In accordance with this invention, generator 13 comprises an exterior hollow cylindrical shell member 70 having a top member 71 and a bottom member 72 secured thereto to form a generally closed vessel. An interior hollow cylindrical shell 73 is disposed within exterior shell 70 in spaced relation thereto to provide an annular flue gas passage 74 therebetween. Suitable insulating material 75 may be disposed about the inner surface of exterior shell 70 to reduce heat transfer to the exterior of the shell. A top member 76 is fastened by screws 78 to close the upper portion of interior shell 73. The bottom portion of interior shell 73 is open and spaced from bottom plate 72 of exterior shell 70 to form a passage for flue gas from the interior of shell 73 to flue gas passage 74. A single pass generator heat exchange coil 50 is disposed in the annular flue gas passage 74. Removal of screws 78 provides access to gas burner 51 in the upper portion of interior shell 73. Gas burner 51 includes a gas nozzle 79 for discharging a stream of gas into interior shell 73.

A baffle 80 is disposed within interior shell 73 and divides it into an upper air chamber 81 and lower combustion chamber 82. Air chamber 81 is substantially closed and an air inlet passage 83, communicating with an air duct 87, is provided to admit ambient air into the air chamber. Baffle 80 is substantially conical in form as shown in the drawing and includes a gas discharge aperture 85 which is co-axially aligned with the axis of interior shell 73 forming combustion chamber 82. Baffle 80 also includes a plurality of radially extending louvers 86 spaced outwardly from gas discharge aperture 85. Louvers 86 are preferably cut from the material of baffle 80, which is preferably of sheet steel, and are bent downwardly from the conical baffle to provide an inclined air directing louver. Louvers 86 therefore provide passage means for discharging air from chamber 81, through baffle 80, into combustion chamber 82. The angular inclination of baffles 86 is such that a rotating motion is imparted to the air passing from air chamber 81 into combustion chamber 82. Consequently, the air admitted to the combustion chamber rotates about the axis of the combustion chamber as it passes toward bottom plate 72.

A suitable splash plate 89 is secured in the apex of conical baffle 80 to a bracket 88 which holds the splash plate and the conical baffle to the stem of gas burner 51 and retains these elements in position in interior shell 73. Gas discharged from nozzle 79 of the gas burner assembly 51 is discharged through gas discharge aperture 85 in baffle 80 and impinges on splash plate 89. Splash plate 89 directs the gas stream along the inclined portion of conical baffle 80 toward the sides of combustion chamber 82. The gas is therefore effectively mixed with the rotating air admitted to the combustion chamber for highly efficient combustion therein.

The gas and air mixture is burned in combustion chamber 82 and the resulting hot flue gas passes downwardly past the bottom portion 77 of interior shell 73 and backwardly up through flue gas passage 74. Flue gas outlet passage 84 is provided to discharge a flue gas to a desired location. As the flue gas passes upwardly through flue gas passage 74, it passes in heat exchange relation with generator coil 50 to heat and boil the weak absorbent solution therein. Suitable fins may be provided on coil 50 to enhance the heat transfer between the flue gas and the solution being heated in the coil.

Referring now particularly to FIGURE 2, absorber 10, condenser 11, evaporator 12, generator 13, and the other components of the absorption refrigeration system are preferably disposed within a housing 90. Housing 90 has an air inlet passage 92 formed therein. Condenser coil 11 and absorber coil 10 are disposed across the air inlet passage. An air outlet passage 93 is also formed in housing 90, and fan 15 is disposed within the air outlet passage. Fan 15 is driven by a suitable electric motor 91 which causes air to be drawn across the condenser and the absorber coil into housing 90 to cool the fluid passing through the condenser and absorber coils. The air is then discharged from housing 90 by the fan through air outlet passage 93.

Fan 15 causes a slight decrease in air pressure inside housing 90 compared with the ambient air pressure on the exterior of the housing. This difference in air pressure is utilized to provide the air necessary for combustion in generator 13. An air duct 87 extends between air chamber 81 in generator 13 and the ambient atmosphere. Flue gas discharge opening 84 discharges flue gas into the interior of housing 90. The difference in air pressure between the exterior and interior of housing 90 forces ambient air into air chamber 81 to provide efficient combustion in combustion chamber 82. The flue gas produced by combustion in the chamber 82 passes into the interior of housing 90 and is discharged therefrom through exhaust air passage 93 by fan 15 along with air passing over the absorber and condenser coils.

It will be appreciated that the embodiment of this invention which is illustrated herein is merely a preferred embodiment thereof and that the invention may take many forms within the scope of this invention. For example, it is not necessary for shells 70 and 73 to be circular in cross section, as shown in the drawing. The arrangement of gas burner 51 may be changed from that illustrated, and it may be desirable to enclose exterior shell 70 in an additional shell to insulate it from the remaining components of the absorption refrigeration system.

An absorption refrigeration machine in accordance with this invention has the advantage of being relatively compact in size and occupying a relatively small volume. This is advantageous, both because the low profile of the generator is compatible with a housing having a relatively small vertical height, and because its small volume reduces the area of floor space required by the machine. Furthermore, it has been found that a generator constructed in accordance with this invention is highly reliable and operates well over a wide range of gas and air inputs without excessive creation of undesirable carbon monoxide and has been found to run efficiently with between 18% and 100% excess air and with ratios of variation in gas input as great as 5 to 1. The danger of explosion or other hazards due to the generator is minimized because the gas is not mixed with air until it has substantially entered the combustion chamber which eliminates the hazard of flash-back into the air chamber. Furthermore, the burner will provide efficient combustion in any orientation so that it can be located for maximum ease of access for servicing. The louvered baffle arrangement not only provides very efficient combustion in the combustion chamber, with low carbon monoxide production, but it also results in good flame holding characteristics. The use of the pressure drop in the housing of the absorption machine eliminates the need for forced draft or combustion air and provides satisfactory operation over a wide variety of conditions.

While a preferred embodiment of this invention has been described for purposes of illustration, it will be understood that the invention may otherwise be embodied within the scope of the following claims.

I claim:
1. An absorption refrigeration machine comprising:
 (A) an evaporator for evaporating refrigerant to produce cooling;
 (B) an absorber for absorbing refrigerant vapor formed in said evaporator;
 (C) a condenser for condensing refrigerant vaporized from weak solution; and
 (D) a generator for boiling weak absorbent solution to concentrate the absorbent solution and to form vapor, said generator comprising:
  (1) an exterior shell member,
  (2) an interior shell member, said interior shell being disposed within said exterior shell and spaced from the side thereof to form a flue gas passage between said shells, and said interior shell having a hollow interior portion defining a combustion chamber, said combustion chamber being in communication with said flue gas passage between said shells so that combustion products from said combustion chamber are discharged into the flue gas passage between said shells,
  (3) a generator heat exchange coil disposed between said shells in said flue gas passage, said heat exchange coil being connected to pass absorbent solution therethrough,
  (4) means to admit gas into said combustion chamber, and
  (5) means to admit air into said combustion chamber including means to cause said air to rotate about the axis of said combustion chamber to promote mixing with gas and to provide efficient combustion therein.

2. An absorption refrigeration machine comprising:
 (A) an evaporator for evaporating refrigerant to produce cooling;

(B) an absorber for absorbing refrigerant vapor formed in said evaporator;
(C) a condenser for condensing refrigerant vaporized from weak solution; and
(D) a generator for boiling weak absorbent solution to concentrate the absorbent solution and to form vapor, said generator comprising:
    (1) an exterior shell member having a bottom wall and a side wall;
    (2) an interior shell member, said interior shell being disposed within said exterior shell and spaced from said side wall thereof to form a flue gas passage, said interior shell having a hollow interior portion, said interior shell being open at the lower portion thereof, and said lower portion of said interior shell being spaced from the bottom wall of said exterior shell,
    (3) a heat exchange coil disposed between the sides of said shells in said flue gas passage, said heat exchange coil being connected to pass absorbent solution to be heated therethrough,
    (4) means for discharging air into said combustion chamber including means to impart rotation to the air admitted to said combustion chamber about the axis of said chamber, and
    (5) means for discharging gas into said combustion chamber and for directing the flow of said gas along a wall of the interior of said inner shell member to mix with the rotating air in said combustion chamber.

3. An absorption refrigeration machine comprising:
(A) an evaporator for evaporating refrigerant to produce cooling;
(B) an absorber for absorbing refrigerant vapor formed in said evaporator;
(C) a condenser for condensing refrigerant vaporized from weak solution; and
(D) a generator for boiling weak absorbent solution to concentrate the absorbent solution and to form vapor, said generator comprising:
    (1) an exterior shell member having a bottom wall and a side wall,
    (2) an interior shell member, said interior shell being disposed within said exterior shell and spaced from said side wall thereof to form a flue gas passage, said interior shell having a hollow interior portion, said interior shell being open at the lower portion thereof, and said lower portion of said interior shell being spaced from the bottom wall of said exterior shell,
    (3) a heat exchange coil disposed between the sides of said shells in said flue gas passage, said heat exchange coil being connected to pass absorbent solution to be heated therethrough,
    (4) a baffle disposed within said interior shell, said baffle dividing the interior of said inner shell into a portion comprising an air chamber and a portion comprising a combustion chamber, passage means to admit air into said air chamber, said baffle being provided with louvers for admitting air from said air chamber to said combustion chamber and for imparting a rotating motion to said air about the axis of said combustion chamber; and
    (5) means for discharging gas into said combustion chamber and for directing the flow of said gas along a wall of the interior of said inner shell member to mix with the rotating air in said combustion chamber.

4. An absorption refrigeration machine comprising:
(A) an evaporator for evaporating refrigerant to produce cooling;
(B) an absorber for absorbing refrigerant vapor formed in said evaporator;
(C) a condenser for condensing refrigerant vaporized from weak solution; and
(D) a generator for boiling weak absorbent solution to concentrate the absorbent solution and to form vapor, said generator comprising:
    (1) an exterior shell member,
    (2) an interior shell member, said interior shell being disposed within said exterior shell and spaced therefrom to form a flue gas passage, and said interior shell having a hollow interior portion defining a combustion chamber,
    (3) a generator heat exchange coil disposed between said shells in said flue gas passage, said heat exchange coil being connected to pass absorbent solution therethrough,
    (4) a fuel outlet disposed in a position to discharge fuel into said combustion chamber,
    (5) means to admit air into said combustion chamber, and
    (6) discharge passage means to discharge products of combustion from said flue gas passage to a desired location, said flue gas passing from said combustion chamber through said flue gas passage, in heat exchange relation with absorbent solution in said generator coil, to said discharge passage.

5. An absorption refrigeration machine comprising:
(A) an evaporator for evaporating refrigerant to produce cooling;
(B) an absorber for absorbing refrigerant vapor formed in said evaporator;
(C) a condenser for condensing refrigerant vaporized from weak solution; and
(D) a generator for boiling weak absorbent solution to concentrate the absorbent solution and to form vapor, said generator comprising:
    (1) an exterior shell member,
    (2) an interior shell member, said interior shell being disposed within said exterior shell and spaced from the side thereof to form a flue gas passage, and said interior shell having a hollow interior portion defining a combustion chamber,
    (3) a generator heat exchange coil disposed between said shells in said flue gas passage, said heat exchange coil being connected to pass absorbent solution therethrough, and
    (4) a baffle disposed within said interior shell, said baffle having a gas discharge aperture aligned with the axis of said combustion chamber formed therein for admitting gas into said combustion chamber, said baffle further having a plurality of louvers extending radially from said gas discharge aperture formed therein, for admitting air into said combustion chamber, said louvers having a portion thereof disposed angularly to impart a rotating motion to the air about the axis of said combustion chamber for efficient combustion therein.

6. An absorption refrigeration machine comprising:
(A) an evaporator for evaporating refrigerant to produce cooling;
(B) an absorber for absorbing refrigerant vapor formed in said evaporator;
(C) a condenser for condensing refrigerant vaporized from weak solution; and
(D) a generator for boiling weak absorbent solution to concentrate the absorbent solution and to form vapor, said generator comprising:
    (1) an exterior shell member having a bottom wall and a side wall,
    (2) an interior shell member, said interior shell being disposed within said exterior shell and spaced from said side wall thereof to form a flue gas passage, said interior shell having a hollow interior portion, said interior shell being open at the lower portion thereof, and said lower portion of said interior shell being spaced from the bottom wall of said exterior shell, (3) a generator heat exchange coil disposed between the sides of said shells in said flue gas passage, said heat exchange coil being connected to pass absorbent solution therethrough, (4) a baffle disposed within said interior shell, said baffle dividing the interior of said inner shell into a portion comprising an air chamber and a portion comprising a combustion chamber, said baffle having a gas discharge aperture therein aligned with the axis of said combustion chamber for admitting gas into said combustion chamber, said baffle further having a plurality of louvers extending radially from said gas discharge aperture for admitting air from said air chamber into said combustion chamber, said louvers having a portion thereof disposed angularly to impart a rotating motion to the air about the axis of said combustion chamber for efficient combustion therein, (5) a gas nozzle disposed in spaced relation with said baffle in a position to discharge gas through said gas discharge aperture into said combustion chamber, and (6) passage means to admit air into said air chamber.

7. An absorption refrigeration machine comprising:
(A) an evaporator for evaporating refrigerant to produce cooling;
(B) an absorber for absorbing refrigerant vapor formed in said evaporator;
(C) a condenser for condensing refrigerant vaporized from weak solution; and
(D) a generator for boiling weak absorbent solution to concentrate the absorbent solution and to form vapor, said generator comprising:
 (1) an exterior shell member having a bottom wall and a side wall,
 (2) an interior shell member, said interior shell being disposed within said exterior shell and spaced from said side wall thereof to form a flue gas passage, said interior shell having a hollow interior portion, said interior shell being open at the lower portion thereof, and said lower portion of said interior shell being spaced from the bottom wall of said exterior shell,
 (3) a generator heat exchange coil disposed between the sides of said shells in said flue gas passage, said heat exchange coil being connected to pass absorbent solution therethrough,
 (4) a conical baffle disposed within said interior shell, said baffle dividing the interior of said inner shell into a portion comprising an air chamber and a portion comprising a combustion chamber, said baffle having a gas discharge aperture therein aligned with the axis of said combustion chamber for admitting gas into said combustion chamber, said baffle further having a plurality of louvers extending radially from said gas discharge aperture for admitting air into said combustion chamber, said louvers having a portion thereof disposed angularly to impart a rotating motion to the air about the axis of said combustion chamber for efficient combustion therein,
 (5) passage means to admit air into said air chamber,
 (6) a gas nozzle disposed in spaced relation with said baffle in a position to discharge gas through said gas discharge aperture into said combustion chamber; and (7) a splash plate disposed in said combustion chamber, said splash plate being aligned with the gas discharge passage in said baffle and spaced from said baffle, and said splash plate being arranged to direct the passage of gas from said nozzle toward the side of said combustion chamber to promote mixture of gas with the rotating air to provide efficient combustion of gas in said combustion chamber.

8. An absorption refrigeration machine comprising:
(A) an evaporator for evaporating refrigerant to produce cooling;
(B) an absorber for absorbing refrigerant vapor formed in said evaporator;
(C) a condenser for condensing refrigerant vaporized from weak solution;
(D) a generator for boiling weak absorbent solution to concentrate the absorbent solution and to form vapor;
(E) a housing containing said absorber and said condenser;
(F) means for passing air over said condenser and said absorber thereby producing a difference in air pressure between the interior of said housing and the exterior of said housing; and
(G) passage means for utilizing the difference in pressure between the interior and the exterior of said housing to pass air into the combustion chamber of said generator and to pass flue gas from said combustion chamber to the exterior of said housing.

9. An absorption refrigeration machine comprising:
(A) an evaporator for evaporating refrigerant to produce cooling;
(B) an absorber for absorbing refrigerant vapor formed in said evaporator;
(C) a condenser for condensing refrigerant vaporized from weak solution;
(D) a generator for boiling weak absorbent solution to concentrate the absorbent solution and to form vapor;
(E) a housing containing said absorber and said condenser;
(F) a fan in said housing for passing air over said absorber and said condenser, thereby producing a pressure difference between the air in the interior region of said housing and the air at the exterior region of said housing;
(G) passage means to admit air from the region of higher pressure into the combustion chamber of said generator to burn with gas therein; and
(H) passage means to discharge the flue gas produced in said combustion chamber into the region of lower pressure.

10. An absorption refrigeration machine comprising:
(A) an evaporator for evaporating refrigerant to produce cooling;
(B) an absorber for absorbing refrigerant vapor formed in said evaporator;
(C) a condenser for condensing refrigerant vaporized from weak solution;
(D) a generator for boiling weak absorbent solution to concentrate the absorbent solution and to form vapor;
(E) a housing containing said absorber and said condenser, said housing having a first air passage formed therein for admitting air into said housing in heat exchange relation with said absorber and said condenser, and said housing having a second air passage formed therein to discharge air from said housing to the atmosphere;
(F) a fan disposed in said second air passage for drawing air into said housing through said first air passage and discharging air from said housing through said second air passage, thereby producing a lower pressure of air within said housing than the air pressure at the exterior of said housing;

(G) an air passage for admitting the relatively higher pressure air from the exterior of said housing into said combustion chamber of said generator for burning of gas therein; and (H) a flue gas passage for discharging flue gas from said generator into the relatively lower pressure interior of said housing for discharge through said second air passage to the exterior of said housing by said fan.

References Cited by the Examiner

UNITED STATES PATENTS 3,080,729  3/1963  Grubb _____ 62—497

FOREIGN PATENTS 1,034,198  7/1958  Germany.

LLOYD L. KING, *Primary Examiner.*